(12) United States Patent
Cascio

(10) Patent No.: US 12,173,429 B2
(45) Date of Patent: Dec. 24, 2024

(54) METHOD TO PROVIDE MULTIFILAMENT BUNDLES OF MELT SPUN POLYMER FILAMENTS

(71) Applicant: ALADDIN MANUFACTURING CORPORATION, Calhoun, GA (US)

(72) Inventor: Anthony Cascio, Calhoun, GA (US)

(73) Assignee: Aladdin Manufacturing Corporation, Calhoun, GA (US)

( * ) Notice: Subject to any disclaimer, the term of this patent is extended or adjusted under 35 U.S.C. 154(b) by 748 days.

(21) Appl. No.: 17/413,356

(22) PCT Filed: Nov. 22, 2019

(86) PCT No.: PCT/US2019/062873
§ 371 (c)(1),
(2) Date: Jun. 11, 2021

(87) PCT Pub. No.: WO2020/123127
PCT Pub. Date: Jun. 18, 2020

(65) Prior Publication Data
US 2022/0042208 A1   Feb. 10, 2022

Related U.S. Application Data

(60) Provisional application No. 62/778,722, filed on Dec. 12, 2018.

(30) Foreign Application Priority Data

Jan. 17, 2019   (EP) .................................... 19152387

(51) Int. Cl.
  *D01D 1/09*     (2006.01)
  *B29C 48/00*    (2019.01)
  (Continued)

(52) U.S. Cl.
  CPC ........... *D01D 1/09* (2013.01); *B29C 48/0018* (2019.02); *B29C 48/0021* (2019.02);
  (Continued)

(58) Field of Classification Search
  CPC ...... D01D 1/09; D01D 5/08; B29C 2948/926; B29C 48/345
  See application file for complete search history.

(56) References Cited

U.S. PATENT DOCUMENTS

| 4,112,561 A | 9/1978 | Norris et al. |
| 4,216,735 A | 8/1980 | McDaniel |

(Continued)

FOREIGN PATENT DOCUMENTS

| CA | 2256050 A1 * | 6/1999 | ............. D01D 1/065 |
| GB | 1275572 | 5/1975 | |

(Continued)

OTHER PUBLICATIONS

International Search Report and Written Opinion issued in PCT/US2021/063605, mailed Mar. 8, 2022, 15 pages.

(Continued)

*Primary Examiner* — Atul P. Khare

(74) *Attorney, Agent, or Firm* — Meunier Carlin & Curfman LLC

(57) ABSTRACT

A method for providing a multifilament bundle of melt spun polymer filaments that includes providing a spinning device including at least M extruders for melting M polymers, M groups of spinning stations, each group comprising N spinning stations, each spinning station comprising a spin pack coupled to a spin pump which receives molten polymer from one of the M extruders and spins a strand of filaments by pushing said polymer through the coupled spin pack, and N transformation stations for bundling M strands of filaments. The method further includes spinning N*M strands of (Continued)

filaments from the spinning stations at a given spin pump output and bundling the strands into N multifilament bundles via the N transformation stations whereby the spin pump outputs are varied over time.

15 Claims, 3 Drawing Sheets

(51) Int. Cl.
    *B29C 48/17*    (2019.01)
    *B29C 48/88*    (2019.01)
    *D01D 4/06*     (2006.01)
    *D01D 5/10*     (2006.01)
    *D01F 8/04*     (2006.01)

(52) U.S. Cl.
    CPC .............. *B29C 48/17* (2019.02); *B29C 48/88* (2019.02); *D01D 4/06* (2013.01); *D01D 5/10* (2013.01); *D01F 8/04* (2013.01)

(56) References Cited

U.S. PATENT DOCUMENTS

| | | |
|---|---|---|
| 4,708,619 A | 11/1987 | Balk |
| 4,789,507 A | 12/1988 | Wesley et al. |
| 5,131,918 A | 7/1992 | Kelley |
| 5,160,347 A | 11/1992 | Kay et al. |
| 5,234,650 A | 8/1993 | Hagen et al. |
| 5,362,563 A | 11/1994 | Lin |
| 5,549,957 A | 8/1996 | Negola et al. |
| 5,834,089 A | 11/1998 | Jones et al. |
| 5,902,531 A | 5/1999 | Berger et al. |
| 5,958,548 A | 9/1999 | Negola et al. |
| 6,076,345 A | 6/2000 | Weiss et al. |
| 6,085,395 A | 7/2000 | Weiss |
| 6,113,825 A | 9/2000 | Chuah |
| 6,119,320 A | 9/2000 | Weiss |
| 6,257,512 B1 | 7/2001 | Schoeck et al. |
| 6,383,432 B1 | 5/2002 | Nakajima et al. |
| 6,406,650 B1 | 6/2002 | Gross et al. |
| 6,900,547 B2 | 5/2005 | Polk, Jr. et al. |
| 7,086,130 B2 | 8/2006 | Jahns et al. |
| 7,651,540 B2 | 1/2010 | Rao |
| 7,845,923 B2 * | 12/2010 | Lennemann ......... B65H 67/064 425/464 |
| 8,182,550 B1 | 5/2012 | Hayes |
| 8,597,553 B1 | 12/2013 | Clark |
| 9,333,721 B2 * | 5/2016 | Hahm ................ D01D 5/28 |
| 9,550,338 B2 | 1/2017 | Clark |
| 2002/0073684 A1 | 6/2002 | Simmen |
| 2005/0008855 A1 | 1/2005 | Figuly et al. |
| 2005/0048253 A1 | 3/2005 | Nord et al. |
| 2005/0048281 A1 | 3/2005 | Royer et al. |
| 2005/0106391 A1 | 5/2005 | Lawrence et al. |
| 2006/0049542 A1 | 3/2006 | Chu et al. |
| 2009/0208695 A1 | 8/2009 | Funatsu et al. |
| 2010/0256319 A1 | 10/2010 | Pereira De Lacerda et al. |
| 2010/0297442 A1 | 11/2010 | Kalies |
| 2012/0034838 A1 | 2/2012 | Li et al. |
| 2013/0200544 A1 | 8/2013 | Hahm et al. |
| 2013/0315029 A1 | 11/2013 | Helbing et al. |
| 2015/0275400 A1 | 10/2015 | Tung |
| 2018/0363239 A1 | 12/2018 | Love et al. |
| 2019/0085483 A1 | 3/2019 | Clark |
| 2019/0105283 A1 | 4/2019 | Anderson et al. |
| 2019/0315962 A1 | 10/2019 | Booth et al. |
| 2019/0360129 A1 | 11/2019 | Nasri et al. |
| 2020/0102698 A1 | 4/2020 | Lu |
| 2020/0115824 A1 | 4/2020 | Stündl et al. |
| 2020/0291547 A1 | 9/2020 | Fischer et al. |
| 2020/0324454 A1 | 10/2020 | Sauer |
| 2021/0388531 A1 | 12/2021 | Cascio et al. |
| 2021/0388539 A1 | 12/2021 | Cascio et al. |
| 2021/0388540 A1 | 12/2021 | Cascio et al. |

FOREIGN PATENT DOCUMENTS

| | | | |
|---|---|---|---|
| JP | 3088597 B2 | | 4/1995 |
| JP | 2005060850 A | * | 3/2005 |
| WO | 1995014806 A1 | | 6/1996 |
| WO | 2001073189 A1 | | 10/2001 |
| WO | 2009037118 A1 | | 3/2009 |
| WO | 2015039971 A1 | | 3/2015 |
| WO | 2020123127 A1 | | 6/2020 |
| WO | 2021257733 A1 | | 12/2021 |
| WO | 2021257738 A1 | | 12/2021 |
| WO | 2021257739 A1 | | 12/2021 |

OTHER PUBLICATIONS

Non Final Office Action issued in co-pending U.S. Appl. No. 17/349,696, mailed Sep. 7, 2023, 10 pages.
Non Final Office Action issued in co-pending U.S. Appl. No. 17/349,699, mailed Aug. 17, 2023, 17 pages.
International Search Report and Written Opinion mailed Feb. 7, 2020 in PCT/US19/62873 (11 pages).
Extended European Search Report completed Jul. 15, 2019 in related European application EP 19152387.7 (7 pages).
International Search Report and Written Opinion issued in PCT/US2022/026128, mailed Jul. 29, 2022 (8 pages).
1 Non-Final Office Action issued in U.S. Appl. No. 17/349,731, mailed Apr. 3, 2024.
International Search Report and Written Opinion issued in PCT/US2021/037684, dated Nov. 1, 2021.
International Search Report and Written Opinion issued in PCT/US2021/037673, dated Nov. 9, 2021.
International Search Report and Written Opinion issued in PCT/US2021/037687, dated Nov. 1, 2021.
Terry, BCF—Bulk Continuous Filament Carpet Fiber, Feb. 5, 2018, [retrieved from the Internet on Aug. 2, 2021 at <https://www.baneclene.com/professionals/Content.aspx?xps=NTY1>] para 1.
Non-Final Office Action issued in U.S. Appl. No. 17/349,696, mailed Mar. 14, 2024.

* cited by examiner

METHOD TO PROVIDE MULTIFILAMENT BUNDLES OF MELT SPUN POLYMER FILAMENTS

CROSS REFERENCE TO RELATED APPLICATIONS

This application claims priority to U.S. Patent Application No. 62/778,722 filed Dec. 12, 2018, and to EP Application No. 19152387.7 filed Jan. 17, 2019, the contents of which are herein incorporated by reference in their entireties.

FIELD OF THE INVENTION

The present invention relates to filaments, strands and bundles of melt spun polymer filaments, and yarns and textile products comprising such, and methods to produce the same.

BACKGROUND OF THE INVENTION

Melt spun filaments, such as melt spun filaments of PET are known in the art. Some types of polymers, hence filaments, strands or bundles, are difficult to dye, or to provide with a color varying along the length of the filament, bundle or strand.

It is known from US20100297442 to vary the output of spin pumps when spinning a plurality of differently colored strands, in order to provide a color variation along the length of the filament, bundle or strand.

SUMMARY OF THE INVENTION

It is an object of the present invention to provide a method to provide multifilament bundles of melt spun polymer filaments, providing a color variation along the length of the filament, bundle or strand.

according to a first aspect, a method for providing a multifilament bundle of melt spun polymer filaments is provided, the method comprising Providing a spinning device comprising
At least M extruders for melting M polymers, M>1;
M groups of spinning stations, each group comprising N spinning stations, N>1, each of the N*M spinning stations comprising a spin pump and a spin pack coupled to this spin pump, said spin pumps of each to the M groups receive molten polymer from one of the M extruders and spin a strand of filaments by pushing said polymer through said coupled spin pack;
N transformation stations for bundling M strands of filaments into a bundle, one strand from each of the M groups of spinning stations;
Spinning out N*M strands from the N*M spinning stations at a given spin pump output for each of the spin pumps;
bundling said strands of filaments into N multifilament bundles of melt spun polymer filaments by means of the N transformation stations, each bundle comprises one strand of each of the M groups of spinning stations;
whereby some or all the spin pump outputs of the spin pumps being varied over time such that
for each of the M groups of spinning stations, the sum of the spin pump outputs of the N spin pumps varies over time in a range of 5% v around the average sum of spin pump of this group of these N spinning stations.

The provision that for each of the M groups of N spinning stations, the sum of spin pump outputs of the spin pumps varies over time in a range of 5% v around the average sum of spin pump of this group of N spinning stations, cause the process to be robust and reduces the risk on damaging the components upstream the spinning stations. Preferably the sum of volumes is kept substantially constant.

The output of the spin pumps, expressed as liters per minute, may be varied over time by multiple measures, such as increasing or decreasing the pump pressure over time, changing the polymer viscosity and/or polymer temperature, etc. and any combination of such measures.

The average output of the spin pumps are not necessarily to be identical for all spin pumps. Different outputs may be provided by using different gears inside the pumps, changing the pump plates, the screens, plates inside the spin pack and/or the spinneret capillary may be altered.

It is understood that different cross sections may be provided to the filaments, such as substantially rectangular, round, oval, tri- or multilobal and alike.

Optionally the spin pump outputs of only one or any number of the M groups of each time N spinning stations are varied over time. Possibly all spin pump outputs of all the M groups of each time N spinning stations are varied over time.

According to some embodiments, for each of the N transformation stations, the sum of spin pump outputs of the spin pumps may be kept substantially constant over time; The latter means that, when A is the average sum of spin pump outputs of the spin pumps of the first, second and optional further group of N spinning stations, the sum of outputs may vary within the range of 0.95*A to 1.05*A.

Each of the N transformation stations receive M strands of filaments, each of these M strands coming from a dedicated spinning station, one from each of the M groups of spinning stations. Hence in each of the N transformation stations, there is one strand originating from each of the M extruders. N bundles of filaments are made, each bundle consisting of the filaments of M strands.

According to some embodiments, M may be 2, 3 or 4. According to a preferred embodiment, M is 3.

According to some embodiments, the M polymers may be of a different color.

According to some embodiments, in each of the N bundles provided by the transformation stations, the color of the filaments of at least one of the strands may differ from the color of the filaments of the other strands.

By varying the output of a spin pump, the titers of the filaments, and of the strand, spun out by the corresponding spin pack, will increase or decrease with growing or reducing the spin pump output. As the sum of spin pump outputs of the spin pumps of each of the N transformation stations is kept substantially constant over time, the total volume of polymer per section of the bundle in the transformation station will be substantially constant. Hence though the titer of the filaments may vary along the length of the filament, the titer of the bundle itself remains substantially constant. It is noted that preferably the titer of each filament in a strand of filaments is substantially equal.

It is understood that the variation of the filament titers, are beyond the normal production variations. The variation of the filament titer in normal production circumstances is typically less than 5% of the average filament titer.

With the titer of a filament, strand, bundle or yarn is meant the linear density of the product, be it a strand, a filament, a bundle or a yarn. The titer expressed as Tt, i.e. in tex (g/km), or as Td, i.e. in denier (g/9 km). For filaments present in a strand, bundle or yarn, "dpf" stands for denier per filament present in the strand, bundle or yarn.

According to some embodiments, the variation of the output of the spin pumps may vary cyclically. This may cause the titer of the filaments and strand to be varied cyclically along said longitudinal axis.

According to some embodiments, the variation of the output of the spin pumps may vary according to a sinusoidal function in time. This may cause the titer of the filaments and strand expressed in function of the position along its longitudinal axis to vary according to a sinusoidal function.

According to some embodiments, the variation of the output of the spin pumps may vary stepwise. This may cause the titer of the filaments and strand in function of the position along its longitudinal axis to vary stepwise.

This stepwise varying of the output of the spin pumps, can be cyclic or non-cyclic, i.e. at random.

According to some embodiments, for each spin pump, the output of the spin pump may have an average output over time, the output varying between a minimum output and a maximum output. The minimum output may be only 10% of this average output, even only 5% of the average output. The maximum output may be up to 200% of the average output.

According to some embodiments, for each spin pump, the output of the spin pump may have an average output over time, the output varying between a minimum output and a maximum output, the difference between the minimum output and maximum output is in the range of 5 to 80% of the average output of the spin pump. More preferred, the difference between the minimum and maximum output is in the range of 10 to 80% of the average output, and most preferred in the range of 40 to 80%, e.g. in the range of 40 to 60%.

Though feasible outside this range of 5 to 80%, the magnitude of variation being larger than the maximal variation, will cause rapid speed changes to the pump. When the magnitude of variation is beyond the minimum variation, the visual effect of changing titers of the filaments, hence strand will be insufficient and rather invisible in the bundle of filaments and yarns made using filaments and strands made according to the method of this first aspect of the invention.

Preferably, for each strand made by one of the spinning stations, the minimum and maximum strand titer is in the range of (1−0.8)*Ts and (1+0.8)*Ts, where Ts is the average strand titer. More preferred, the minimum and maximum strand titer is in the range of (1−0.6)*Ts and (1+0.6)*Ts.

According to some embodiments, each of the filaments may have an average filament titer in the range of 2 to 40 denier. More preferred, the average filament titer is in the range of 3 to 16 denier.

According to some embodiments, the strand made by each one of the spinning stations may comprise 8 to 150 filaments. More preferred, the strand may comprise 17 to 120 filaments.

According to some embodiments, the polymer may be chosen from the group consisting of polyamides, polyesters and polyolefins.

The polymer may be aromatic or aliphatic polyamide, such as PA6, PA66, PA10, PA12, PA56, PA610, PA612, PA510. The polyamide can be a polyamide blend (copolymer) or homopolymer or partially recycled or fully based upon recycled polyamide.

The polymer may be polyester, such as polyethylene terephthalate (PET) or polytrimethylene terephthalate (PTT). The PET can be virgin PET or partially or fully based upon recycled PET. Such PET is described in e.g. U.S. Pat. No. 8,597,553.

The polymer may be a polyolefin, such as polyethylene (PE), polypropylene (PP), Most preferred, the polymer is PET, PTT, PP, PA6, PA66 or PES.

According to some embodiments, the polymer of the filaments may be solution dyed polymer.

According to some embodiments, the cross section of the filaments may be circular, trilobal, elliptic, or may have any know cross section.

The crystallinity of each of the filaments of a strand may be substantially uniform along the length, i.e. along its axis, of the filament. Along a cross section of the strand spun out in a spinning station, the crystallinity of the filaments may be substantially uniform.

When different polymers with different colors are used, the color of the bundle of filaments will vary along with the varying titer of the filaments, the color of the filaments will remain the same.

According to some embodiments, for each of the N transformation stations, the sum of spin pump outputs of the spin pumps providing multifilament strands to this transformation station may vary over time in a range of 2.5% v around the average sum of spin pump outputs of the spin pumps providing multifilament strands to this transformation station, preferably in a range of 1.5% v around the average sum of spin pump outputs of the spin pumps providing multifilament strands to this transformation station.

According to some embodiments, N may be in the range of 2 to 50, preferably in the range of 2 to 25.

Each of the N transformation stations receive M strands of filaments, one strand of each of the M group of N spinning stations. Preferably the number of filaments present in each of these M strands provided to a transformation station is identical. Preferably the average titer of the strands and possibly of the filaments present in each of these M strands provided to a transformation station is identical.

According to some embodiments, for some or all the N bundles, the titer may vary along the length of the bundle.

According to some embodiments, for some or all the N bundles, the titer may be constant along the length of the bundle, the variation of the strand titer of one of the strands is compensated by a variation of the strand titer of at least one of the other strands of filaments.

According to some embodiments, the variation of the strand titer of one of the strands may be compensated by a variation of the strand titer of one of the other strands of filament. According to some embodiments, the bundle comprises two strands, the bundle titer is constant along the length of the bundle, the variation of the strand titer of one strand is compensated by a variation of the strand titer of the other strands.

According to some embodiments, the bundle comprises three strands, the bundle titer is constant along the length of the bundle, the variation of the strand titer of one strand is compensated by a variation of the strand titer of one of the other two strands.

According to some embodiments, the bundle comprises three strands, the bundle titer is constant along the length of the bundle, the variation of the strand titer of one strand is compensated by a variation of the strand titers of the other two strands.

According to some embodiments, the cross section of the filaments may differ between filaments of different strands, combined to one bundle.

According to some embodiments, the number of filaments per strand is equal for all strands in each of the bundles.

According to some embodiments, the filaments may be bulked continuous filaments.

According to some embodiments, for each filament, the crystallinity of the filaments of the bundle may be substantially uniform along the length, i.e. along the axis, of the filaments.

According to some embodiments, along a cross section of the bundle, the crystallinity of the filaments of the bundle may be substantially uniform.

In the bundle, the filaments of the strands are varied in diameter, hence in titer.

According to some embodiments, in the bundle, each of said filaments may have an average filament titer in the range of 2 to 40 denier.

More preferred, the average filament titer is in the range of 3 to 16 denier.

According to some embodiments, each of the spinning stations may further quench the strand of filaments.

According to some embodiments, each of the transformation stations may further elongate the bundle of filaments.

According to some embodiments, each of the transformation stations may further texturize the bundle of filaments.

This texturizing or bulking can be done by any conventional means such as but not restricted to gear wheels, a false twist system, stuffer boxes or alike.

According to some embodiments, each of the transformation stations may further entangle the bundle of filaments at discrete lengths along the length of the bundle of filaments. This is also known as tacking the bundle of filaments. Typically, this entanglement may be done at distances of 1 to 20 cm one from the other.

As such the bundle of filaments obtained may be a bulked continuous filament bundle (or BCF bundle). These bundles may further be converted into BCF yarn and may be used to provide textile products such as but not limited to tufted products (where the BCF is used as pile yarn), woven or knitted fabrics and alike.

The spinning device may comprise a control unit to control the spinning output of each of the spin pumps.

According to a second aspect, a method for providing multifilament strands of melt spun polymer filaments is provided, the method comprising Providing a spinning device comprising At least one extruder for melting a polymer;

At least a group of N spinning stations, N>1, each spinning station comprising a spin pump and a spin pack coupled to this spin pump, said spin pumps receive molten polymer from the at least one extruder and spin a strand of filaments by pushing said polymer through said coupled spin pack;

Spinning out N strands from the spinning stations of the group of N spinning stations at a given spin pump output for each spin pump;

whereby some or all the spin pump outputs of the spin pumps being varied over time such that for the group of N spinning stations, the sum of the spin pump outputs of the N spin pumps varies over time in a range of 5% v around the average sum of spin pump of this group of these N spinning stations.

According to a third aspect of the invention, a method to provide multifilament bundles of melt spun polymer filaments, the method comprising Providing a first group of N multifilament strands of melt spun polymer filaments being multifilament strands of melt spun polymer filaments according to claim 10;

Providing at least a second group of N multifilament strands of melt spun polymer filaments;

Bundling each one of the first multifilament strands of the first group of multifilament strands to one multifilament strand of the second group of multifilament strands to provide N multifilament bundles of melt spun polymer filaments.

According to some embodiments, the second group of multifilament strands of melt spun polymer filaments may be multifilament strands of melt spun polymer filaments according to the second aspect of the invention.

According to some embodiments, the method further comprises providing a third group of N multifilament strands of melt spun polymer filaments, and bundling each one of the first multifilament strands of the first group of multifilament strands to one multifilament strand of the second group of multifilament strands and one multifilament strand of the third group of multifilament strands to provide N multifilament bundles of melt spun polymer filaments.

According to some embodiments, the third group of multifilament strands of melt spun polymer filaments are multifilament strands of melt spun polymer filaments according to the second aspect of the invention.

According to a fourth aspect of the invention, a method to provide multifilament bundles of melt spun polymer filaments is provided, the method comprising Providing M groups of N multifilament strands of melt spun polymer filaments being multifilament strands of melt spun polymer filaments according to the second aspect of the invention, M>1;

bundling M strands of filaments into N multifilament bundles of melt spun polymer filaments by means of the N transformation stations, each bundle comprises one strand of each of the M groups of N spinning stations.

According to some embodiments, for each of the N transformation stations, the sum of spin pump outputs of the spin pumps providing multifilament strands to this transformation station varies over time in a range of 2.5% v around the average sum of spin pump outputs of the spin pumps providing multifilament strands to this transformation station, preferably in a range of 1.5% v around the average sum of spin pump outputs of the spin pumps providing multifilament strands to this transformation station.

The independent and dependent claims set out particular and preferred features of the invention. Features from the dependent claims may be combined with features of the independent or other dependent claims, and/or with features set out in the description above and/or hereinafter as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

The same reference signs refer to the same, similar or analogous elements in the different figures.

DESCRIPTION OF ILLUSTRATIVE EMBODIMENTS

The present invention will be described with respect to particular embodiments. It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could.

Furthermore, the particular features or characteristics may be combined in any suitable manner in one or more embodiments, as would be apparent to one of ordinary skill in the art.

Figure 1:
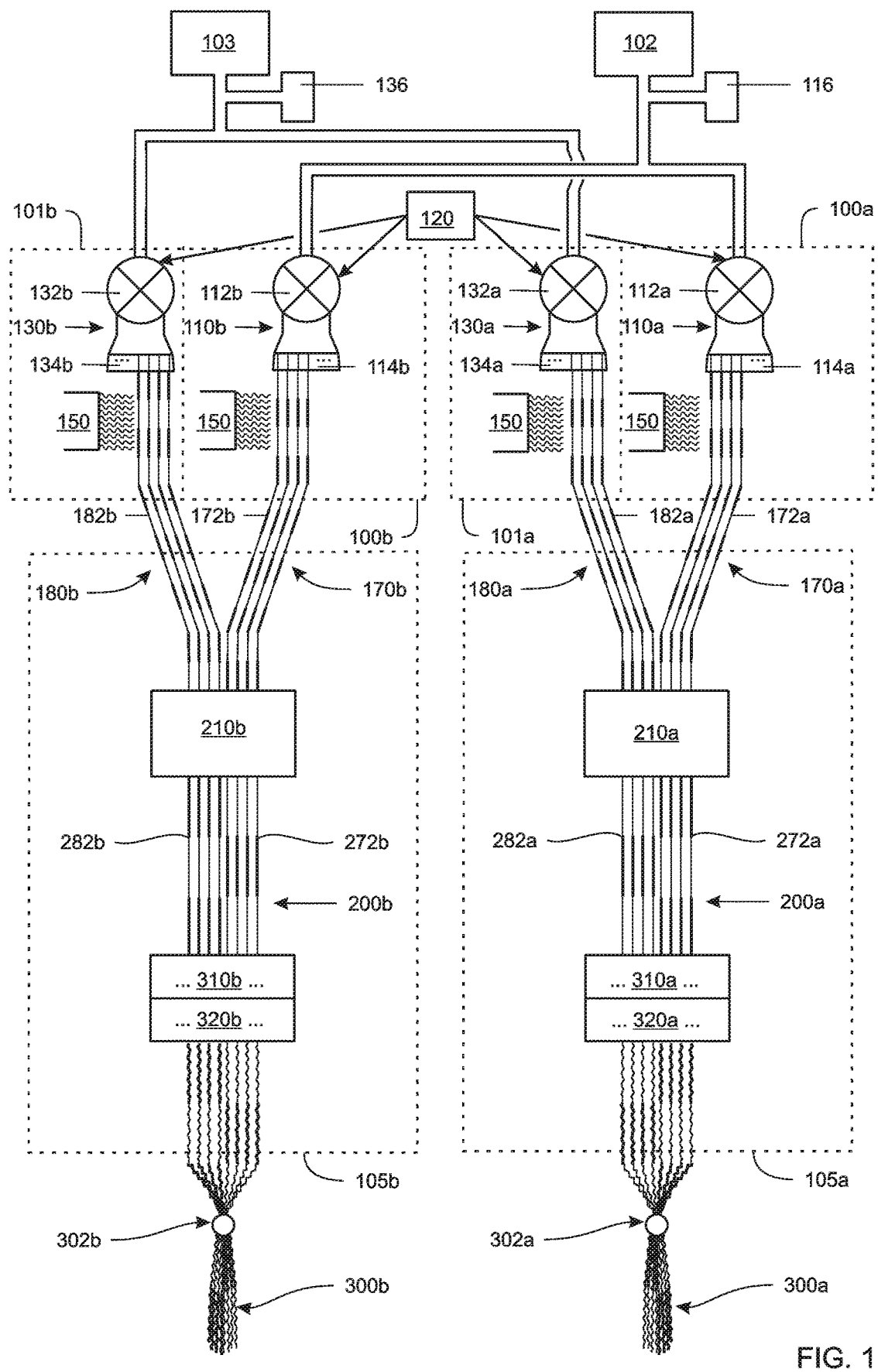
FIG. 1 is a schematic view of a system to implement the production method of a bundle of melt spun filaments according to the invention.

A process to provide a yarn is shown in FIG. 1. As an example here, a yarn 300a or 300b comprising one bundle 200a or 200b is provided, which bundle comprises two strands 170a and 180a, respectively 170b and 180b of melt spun polymer filaments 172a and 182a, respectively 172b and 182b.

Four spinning station 100a, 101a, 100b and 101b are shown, each spinning station comprising a spin pack 110a, 130a, 110b, respectively 130b, each of them comprising a spin pump 112a, 112b, 132a respectively 132b, providing molten polymer to a spinneret 114a, 114b, 134a respectively 134b.

Spinning stations 100a and 100b belong to a first group of a number of spinning stations (of which 2 are shown), which receive molten polymer form extruder 102. Spinning stations 101a and 101b belong to a second group of a number of spinning stations (of which 2 are shown), which receive molten polymer form extruder 103.

A dye pack 116 which provides the dye to the molten polymer of extruder 102. A dye pack 136 which provides the dye to the molten polymer of extruder 103. The ratio polymer/dye is kept unchanged with changing polymer volumes pumped through the corresponding spin pump.

A control device 120 controls, via the settings of the spin pumps 112a, 112b, 132a and 132b, how much volume of polymer is spun through the spinnerets 114a, 114b, 134a and 134b per time unit. As shown in FIG. 1, the volume spun via spin pump 112a and 112b is stepwise but cyclically increased and decreased, the volume spun via spin pump 112a is alternatingly changed in comparison to the volume spun via spin pump 112b. In the meantime, and alternating with this variation in spun volume of pump 112a and 112b, the volume spun via spin pumps 132a and 132b are stepwise but also cyclically decreased and increased. The two variations of pumps 112a and 132a are tuned to each other such that the total volume of polymer spun by the two spin pumps, remains substantially constant. The two variations of pumps 112b and 132b are tuned to each other such that the total volume of polymer spun by the two spin pumps, remains substantially constant. The two variations of pumps 112a and 112b are tuned to each other such that the total volume of polymer taken from extruder 102 remains substantially constant. The two variations of pumps 132a and 132b are tuned to each other such that the total volume of polymer taken from extrude 103, remains substantially constant.

As a result, two times two strands of filaments (170a and 180a, and 170b and 180b) are spun out by the four spinning stations. The number of filaments (N) per strand are equal. The strands are quenched by quenching means 150.

Figure 2:
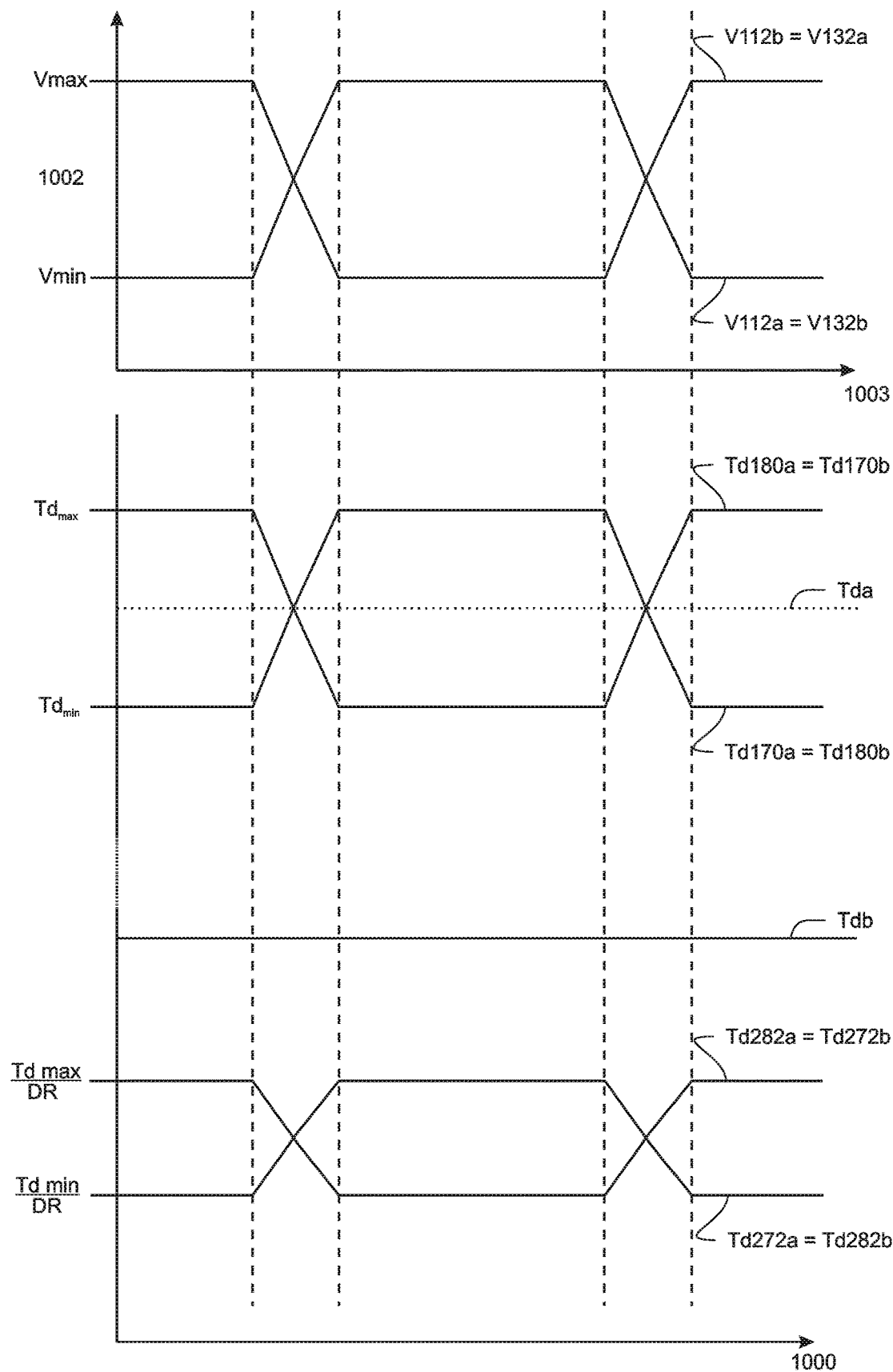
FIG. 2 is a schematic view of the spin pump output of the pumps used in the method of FIG. 1.

Each group of spun filaments, being the strands 170a and 180a, respectively 170b and 180b, have, along the axis of the strand, a cyclically stepwise varying titer Td170 and Td180. This is shown in FIG. 2.

The two strands 170a and 180a are combined and provide the bundle 200a in transformation station 105a. All filaments 172a and 182a are extended and drawn at the same drawing ratio by a drawing installation 210a, e.g. one or more sets of godets. In the drawn bundle, the filaments 272a are obtained by reduction of titer of filaments 172a via drawing installation 210a. The filaments 282a are obtained by reduction of titer of filaments 182a via drawing installation 210a.

So in the drawn bundle 200a, along the axis of the strands, the filaments 272a and 282a have a cyclically stepwise varying titer Td272 and Td282, respectively. This is shown in FIG. 2.

After being drawn, the bundle 200a is texturized or "bulked" using a texturizing means 310a, and at regular distances along the length of the bundle, the filaments are entangled into knot 302a using an air entangling means 320a. As such a BCF yarn 300a is provided.

In a similar way, the two strands 170b and 180b are combined and provide the bundle 200b in transformation station 105b. All filaments 172b and 182b are extended and drawn at the same drawing ratio by a drawing installation 210b, e.g. one or more sets of godets. In the drawn bundle, the filaments 272b are obtained by reduction of titer of filaments 172b via drawing installation 210b. The filaments 282b are obtained by reduction of titer of filaments 182b via drawing installation 210b.

So in the drawn bundle 200b, along the axis of the strands, the filaments 272b and 282b have a cyclically stepwise varying titer Td272 and Td282, respectively. This is shown in FIG. 2.

After being drawn, the bundle 200b is texturized or "bulked" using a texturizing means 310b, and at regular distances along the length of the bundle, the filaments are entangled into knot 302b using an air entangling means 320b. As such a BCF yarn 300b is provided.

The titers (indicated in ordinate 1001) of various element are shown in FIG. 2. The filaments 170a and 180b have a titer along its length (indicated in abscissa 1000) a titer Td170a and Td180b which varies stepwise between the minimum value Tdmin and the maximum value Tdmax. The filaments 170b and 180a have a titer along its length (indicated in abscissa 1000) a titer Td170b and Td180a which varies stepwise between the minimum value Tdmin and the maximum value Tdmax, but varies opposite to titer Td170*a* and Td180*b*. The average titer of the filaments in the strand is indicated Tda.

This change in titers of the filaments is related in a one to one basis to the volumes of the spin pumps used to make the filaments. Also shown in FIG. 2, the volumes (indicated in ordinate 1002) of various spin pumps are shown in FIG. 2. The spin pumps 112*a* and 132*b* spin a volume over time (indicated in abscissa 1003) being V112*a* and V132*b* which varies stepwise between the minimum value Vmin and the maximum value Vmax. The spin pumps 112*b* and 132*a* spin a volume over time (indicated in abscissa 1003) being V120*b* and V132*a* which varies stepwise between the minimum value Vmin and the maximum value Vmax. As can be noticed in FIG. 2, the volume of polymer material provided by the extruder 102, being V112*a*+V112*b*, is substantially constant over time. The volume of polymer material provided by the extruder 103, being V132*a*+V132*b*, is substantially constant over time. The strands themselves have a titer being the multiplication of the filament titer Td170*a*, Td170*b*, Td180*a* or Td180*b* with the number of filaments in the strand. Hence the strand titer also cyclically varies and the variation of the strand titer and the filament titers are proportional.

After the filaments are reduced in titer with a drawing ratio DR, the filaments 272*a*, 272*b*, 282*a* and 282*b* have a titer along its length being a titer Td272*a*, Td272*b*, Td282*a* and Td282*b* which varies stepwise between the minimum value Tdmin/DR and the maximum value Tdmax/DR.

The titer of the bundle 200*a* or 200*b* after drawing, and of the yarn 300*a* and 300*b* after texturizing and air entangling, is shown as Tdb, which equals "(L×(Td272*a*+Td282*a*))/DR", L being the number of filaments in the strands. Tdb is substantially identical along the length of the bundle or yarn.

As an example, polyamide is used to provide the two spin packs with molten polymer. In each spin pack, the polymer, molten to a temperature of 250° C., is spun out through a spinneret with 75 spin openings. In the first spin pack, a blue colorant is added at a ratio of 3%. In the second spin pack, a green colorant is added at a ratio of 4%.

The filaments spun have cyclically, stepwise varying titer because the spin pumps are set to have a controlled, accordingly varying spin pump output. The titer of the spun filaments vary between +/−40% denier. The spin pumps are synchronized such that the total volume of polymer spun by both pumps remain constant.

The two stands are combined to a bundle of two times 75 filaments from each strand, i.e. 150 filaments in the bundle, which bundle is drawn at a drawing ratio 2.5. The titer of the spun filaments vary between 12.1 and 5.2 denier, while the bundle titer is substantially constant at 1300. The bundle is texturized by most commonly air or steam and every 3 cm, a knot is provided by air entangling. This results in a BCF yarn with a titer of 1300 denier.

Because of the two distinct colors, the yarn has zones which show more green because in this section of the yarn, the green filaments of the one strand are thicker hence provide relatively a higher volume to the yarn in this section. The yarn has also zones which show more blue because in this section of the yarn, the blue filaments of the one strand are thicker hence provide relatively a higher volume to the yarn in this section.

It is understood that for the scheme shown in FIG. 1, there are 2 groups of spinning stations, each group comprising 2 spinning stations, i.e. the first group comprising spinning stations 100*a* and 100*b*, the second group comprising spinning stations 101*a* and 101*b*. This because two extruders are used to provide molten polymer to the spinning stations. Possibly, 3 or more extruders are used. Each group may comprise 3 or more, i.e. a plurality of spinning stations. As an example, three extruders and three groups of spinning stations may be provided. Each group may comprise e.g. 24 spinning pumps and hence 24 spinning stations. The sum of the volume spun out by these 24 spin pumps over time may vary about 5% v over the average these 24 spin pumps displace per time, and preferably is about constant. A too large increase of polymer displacement of one or more of these 24 spin pumps is to be compensated to some extent by a reduction of polymer displacement by one or more other spin pumps of this group. The control unit 120 is to adjust the volumes displaced by each of these 24 spin pumps.

As there are in this example three extruders provide, there are 24 transformation stations provided, each transformation station receiving 3 strands of filaments, one strand from each group of spinning stations. Possibly, as further shown in FIG. 3, the three strands of filaments in each of the transformation stations are provided such that the titer of the bundle provided by this transformation station is kept substantially constant. This means that for each cluster of three spin pumps feeding one transformation station, one spin pump belonging to one of the three groups of spinning stations, the sum of the volumes of polymer displaced by these spin pumps is kept substantially constant. The control unit 120 can be set to adjust the volumes displaced by each of these 3 spin pumps. As the volumes displaced by each of the 24 spin pumps of each of the three groups of spinning stations is to be controlled a set out above, the control unit will have to adjust the polymer volumes spun out (or displaced) by each of these 3 times 24 spin pumps. A memory storage unit or an algorithm driven feed may provide the spin pump settings for each spin pump n function of time.

Figure 3:
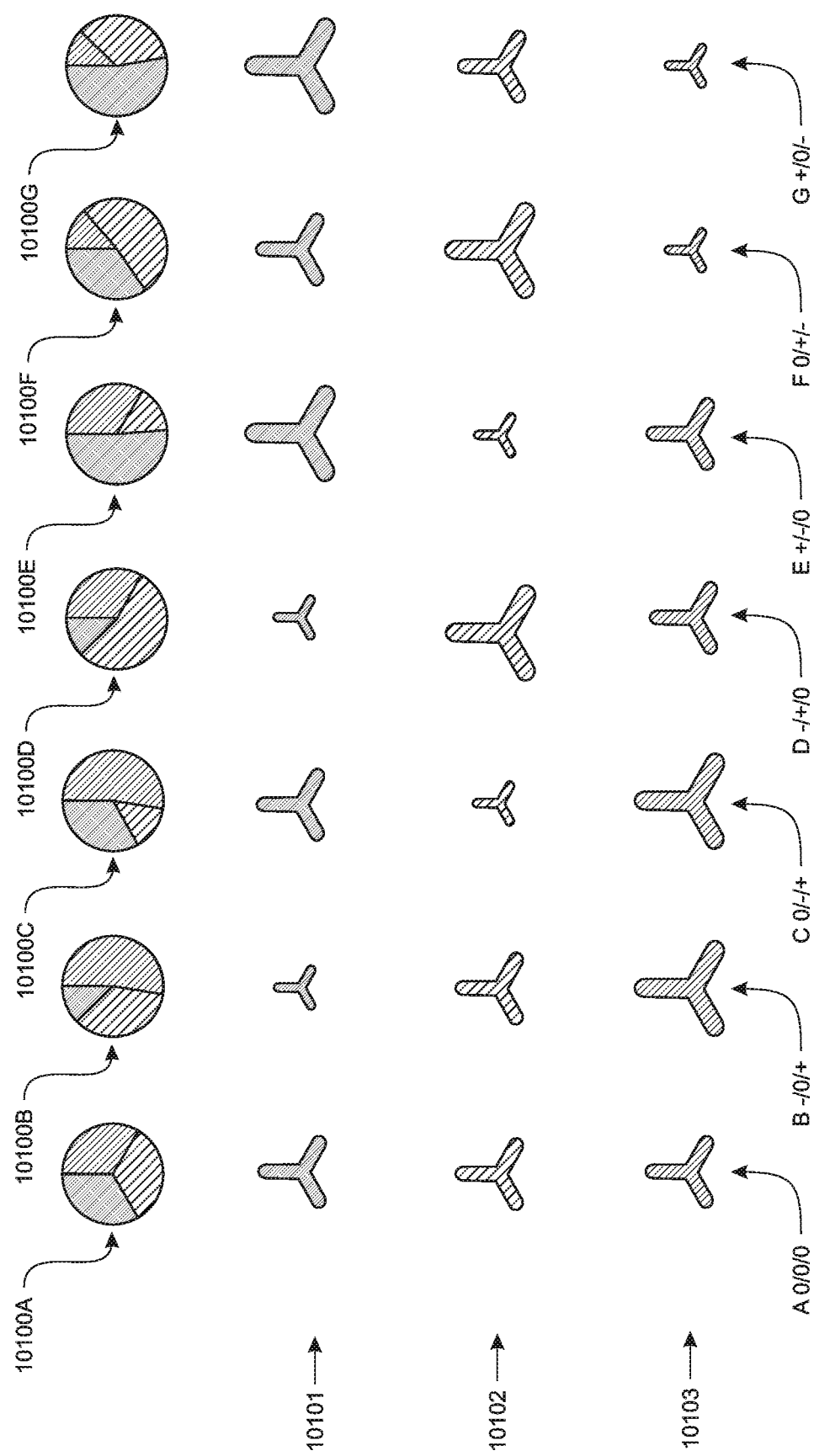
FIG. 3 shows schematically the cross sections of filaments present in a strand according to the invention.

A schematic view of the possible variations of cross sections of the filament, strand and bundle for one of the 24 transformation stations, made using a method according to the invention, is given in FIG. 3.

A multifilament bundle of three multifilament strands is made, each strand comprising 75 trilobal filaments of PA6. The cross section of one filament 10101, 10102 respectively 10103 of each strand is shown in FIG. 2. The color of the filaments of the three strands are different. Filaments 10101 are reddish in color, filaments 10102 are yellowish, while filaments 10103 are blueish.

At a first section A, the three strands all have filaments having the average filament titer. The volumetric amount of filaments present in each color is represented in the pie chart 10100A. All colors are present in the same amount, providing the bundle a given brownish color.

In a second section B, the filament titer of strand 10101 is reduced, while the titer of the filaments of the strand 10103 is increased. The titer of filaments 10102 remain as in section A. The average titer of the bundle remains constant and identical to the bundle titer at section A. As such, less polymer, hence color of strand 10101 and more of strand 10103 is present, resulting in a color at that position in the bundle having a higher color component of strand 10103. At that position, the bundle has a color with a rather blue-greenish color.

In a second section C, the filament titer of strand 10102 is reduced, while the titer of the filaments of the strand 10103 is increased. The titer of filaments 10101 remain as in section A. The average titer of the bundle remains constant and identical to the bundle titer at section A. As such, less polymer, hence color of strand 10102 and more of strand

10103 is present, resulting in a color at that position in the bundle having a higher color component of strand 10103. At that position, the bundle has a color with a rather blue-burgundy-like color.

In a similar way, in sections D to G, each time one filament titer is reduced while another is increased, causing a different color to be present for the bundle with a more red, blue or yellow color tone, while the average bundle titer remains substantially constant along the length of the bundle.

Along the whole length of the bundle, the bundle titer remains substantially constant, being the sum of the titers of the three times 75 filaments of the three strands.

Instead of bundles having a different color, bundles with different dyability for one or more dyes can be combined in the very same way. Once the textile product (bundle, yarns, greige product, etc.) is dyed, the very same effect in color variation is obtained.

It is to be understood that although preferred embodiments and/or materials have been discussed for providing embodiments according to the present invention, various modifications or changes may be made without departing from the scope and spirit of this invention.

The invention claimed is:

1. A method for providing a multifilament bundle of melt spun polymer filaments, the method comprising:
   providing a spinning device comprising:
   M extruders for melting M polymers, wherein M>1, and wherein each of the M extruders extrudes at least M streams of its polymer as a molten stream;
   M groups of spinning stations, each group of the M groups of spinning stations comprising N spinning stations, wherein N>1, each of the N*M spinning stations comprising a single spin pump and a single spin pack coupled to the spin pump, where each spin pump of each of the M groups of spinning stations receives the molten stream of polymer from only one of the M extruders, and spins a strand of filaments by pushing said molten stream of polymer through its coupled spin pack so as to form the strand originated from the molten polymer of the respective associated one of the M extruders;
   N transformation stations for bundling M strands of filaments into bundles, wherein each of the N transformation stations is associated with a respective one of the M groups of spinning stations so as to receive only one of the strands of filaments originated from each of the M groups of spinning stations;
   spinning out the N*M strands from the N*M spinning stations at a given spin pump output measured in units of volume per units of time for each of the spin pumps; and
   bundling said strands of filaments into N multifilament bundles of melt spun polymer filaments by means of the N transformation stations;
   whereby some or all of the spin pump outputs of the spin pumps are varied over time such that: for each of the M groups of spinning stations the sum of the volumes of the spin pump outputs of the N spin pumps varies over time in a range of at most 5% by volume around an average sum of volumes of output of the spin pump of the group of N spinning stations.

2. The method according to claim 1, wherein for each of the N transformation stations, the sum of the spin pump outputs of the spin pumps is kept substantially constant over time.

3. The method according to claim 1, wherein M is 2, 3, or 4.

4. The method according to claim 1, wherein the M polymers are of a different color from one another.

5. The method according to claim 1, wherein for each transformation station of the N transformation stations, the sum of the spin pump outputs of spin pumps providing multifilament strands to the associated transformation station varies over time in a range of at most 2.5% by volume around the average sum of the spin pump outputs of the spin pumps providing multifilament strands to each transformation station.

6. The method according to claim 1, wherein N is in the range of from 2 to 50.

7. The method according to claim 1, wherein each of the spinning stations further quenches the associated strand of filaments.

8. The method according to claim 1, wherein each of the transformation stations further elongates the associated bundle of filaments.

9. The method according to any claim 1, wherein each of the transformation stations further texturizes the associated bundle of filaments.

10. The method according to claim 1, wherein each of the transformation stations further entangles the associated bundle of filaments at discrete lengths along the length of the associated bundle of filaments so as to form entanglements at discrete lengths along the length of the associated bundle of filaments, wherein the entanglements are spaced 1 to 20 cm apart.

11. The method according to claim 1, wherein the color of the filaments of at least one of the strands within each of the N bundles provided by the transformation stations differs from the color of the filaments of the other strands of the N bundles.

12. A method of providing a multifilament bundle of melt spun polymer filaments, the method comprising:
   providing M extruders, wherein:
   M is an integer greater than 1,
   each of the M extruders is configured to melt a polymer and extrude a stream of molten polymer,
   each of the M extruders is configured to extrude a volume of the stream of molten polymer specific to that extruder over a time interval, and
   a sum of the volumes of streams of molten polymer extruded by all of the M extruders is configured to vary by 5% or less during the time interval;
   providing M groups of spinning stations, wherein:
   each of the M groups of spinning stations is comprised of N spinning stations, and
   N is an integer greater than 1;
   wherein:
   each of the spinning stations is comprised of only one spin pump, where the spin pump is coupled to only one spin pack and to only one of the M extruders and is disposed between its associated spin pack and extruder,
   each of the spin pumps is configured to receive a portion of the stream of molten polymer from its associated extruder, and
   each of the spinning stations is configured to spin one strand of filaments extruded from its associated one spin pack, such that M*N strands configured to form N multifilament bundles are extruded from all of the spin packs in all of the groups of spinning stations; and wherein each of the spin pumps in each of the groups of spinning stations is configured to vary a volumetric output of an associated one strand of filaments at time periods within the time interval.

13. The method of providing a multifilament bundle of melt spun polymer filaments of claim 12, further comprising:
bundling together the strands of filaments produced within each spinning station to produce the N bundles of filaments, wherein a titer of each of the filaments varies by less than 5% during the time interval.

14. The method of providing a multifilament bundle of melt spun polymer filaments of claim 13, wherein during the time interval a volume of molten polymer pumped through the M groups of spinning stations varies by 5% or less.

15. The method of providing a multifilament bundle of melt spun polymer filaments of claim 14, wherein the sum of the volumes of streams of molten polymer extruded by all of the extruders is substantially constant during the time interval.

* * * * *